US012598635B2

(12) United States Patent
Miao et al.

(10) Patent No.: US 12,598,635 B2
(45) Date of Patent: Apr. 7, 2026

(54) METHODS, COMPUTER READABLE MEDIUM AND DEVICES FOR COMMUNICATION

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 448 days.

(21) Appl. No.: 18/017,292

(22) PCT Filed: Jul. 31, 2020

(86) PCT No.: PCT/CN2020/106403
§ 371 (c)(1),
(2) Date: Jan. 20, 2023

(87) PCT Pub. No.: WO2022/021419
PCT Pub. Date: Feb. 3, 2022

(65) Prior Publication Data
US 2023/0276486 A1      Aug. 31, 2023

(51) Int. Cl.
*H04W 72/56*      (2023.01)
*H04W 72/25*      (2023.01)
(52) U.S. Cl.
CPC ........... *H04W 72/56* (2023.01); *H04W 72/25* (2023.01)
(58) Field of Classification Search
CPC ..... H04W 72/56; H04W 72/25; H04W 72/20; H04W 76/14
USPC ......................................... 370/310, 328, 329
See application file for complete search history.

(56) References Cited

U.S. PATENT DOCUMENTS

| | | | |
|---|---|---|---|
| 2018/0359787 A1 | 12/2018 | Lee et al. | |
| 2020/0053743 A1 | 2/2020 | Cheng | |
| 2022/0279487 A1* | 9/2022 | Ding | H04W 72/40 |

(Continued)

FOREIGN PATENT DOCUMENTS

| | | |
|---|---|---|
| CN | 106664699 A | 5/2017 |
| CN | 110099366 A | 8/2019 |
| CN | 111148078 A | 5/2020 |
| EP | 4 140 223 | 3/2023 |
| JP | 2007-221567 A | 8/2007 |

(Continued)

OTHER PUBLICATIONS

"Discussion on SCI Content for 5G V2X," Xiaomi, 3GPP TSG RAN WG1 #100bis, Apr. 20-30, 2020, R1-2002400 (4 pages total).

(Continued)

*Primary Examiner* — Obaidul Huq
(74) *Attorney, Agent, or Firm* — Sughrue Mion, PLLC

(57)      ABSTRACT
Embodiments of the present disclosure relate to communication. According to embodiments of the present disclosure, a first terminal device receives first control information indicating a first set of resources reserved by a second terminal device and second control information indicating a second set of resources reserved by a third terminal device, respectively. If the first set of resources and the second set of resources overlap with each other, the first terminal device whether a condition associate with coordination of terminal devices is satisfied. If the condition is satisfied, the first terminal device transmits an indication to at least one of the second and third terminal devices. In this way, collisions in resources can be avoided. Further, it also can solve the hidden node problem.

13 Claims, 11 Drawing Sheets

(56)  References Cited

U.S. PATENT DOCUMENTS

2023/0156776 A1*  5/2023  Kupanna Subramani .................. H04W 4/46
                                                          370/329
2023/0189292 A1*  6/2023  Ganesan ............... H04W 76/11
                                                          370/329

FOREIGN PATENT DOCUMENTS

WO        2020/011336 A1    1/2020

OTHER PUBLICATIONS

"Resource Allocation Mode 2 for NR SL," Ericsson, 3GPP TSG-RAN WG1 Meeting #101-e, May 25-Jun. 5, 2020, R1-2004544 (12 pages total).

Extended European Search Report issued Aug. 24, 2023 in Application No. 20947211.7.
International Search Report for PCT/CN2020/106403 dated Apr. 30, 2021.
Written Opinion for PCT/CN2020/106403 dated Apr. 30, 2021.
JP Office Action for JP Application No. 2023-506338, mailed on Apr. 23, 2024 with English Translation.
Intel Corporation, "Design Options to Support Priority for V2V Communication", 3GPP TSG RAN WG1 #85 R1-164139, May 14, 2016, pp. 1-pp. 6.
Ericsson, "PHY layer procedures for NR sidelink", 3GPP TSG RAN WG1 Meeting #98bis R1-1910538, pp. 1-pp. 14.
JP Office Communication for JP Application No. 2023-506338, mailed on Aug. 6, 2024 with English Translation.
Ericsson, "PHY layer procedures for NR sidelink", 3GPP TSG RAN WG1 Meeting #98bis R1-1910538, Oct. 14-20, 2019, p. 1-p. 14.

* cited by examiner

700

710

RECEIVE FIRST CONTROL INFORMATION

720

RECEIVE SECOND CONTROL INFORMATION

730

DETERMINE WHETHER THE FIRST SET OF RESOURCES AND THE SECOND SET OF RESOURCES OVERLAP

740

DETERMINE WHETHER A CONDITION IS SATISFIED

750

TRANSMIT AN INDICATION

800

810

GENERATE CONTROL INFORMATION INDICATING A
SET OF RESOURCES

820

TRANSMIT THE CONTROL INFORMATION

830

RECEIVE AN INDICATION CONCERNING OVERLAPPED
RESOURCES

METHODS, COMPUTER READABLE MEDIUM AND DEVICES FOR COMMUNICATION

CROSS REFERENCE TO RELATED APPLICATIONS

This application is a National Stage of International Application No. PCT/CN2020/106403 filed Jul. 31, 2020.

TECHNICAL FIELD

Embodiments of the present disclosure generally relate to the field of telecommunication, and in particular, to methods, devices for communication, and computer readable medium.

BACKGROUND

With development of communication technologies, different communication scenarios have been proposed. For example, sidelink communication has been proposed. Sidelink is the special kind of communication mechanism between device and device without going through a network device. The technology of "sidelink" can be applied to various scenarios, for example, vehicle-to-vehicle (V2V), vehicle-to-everything (V2X) and the like. There may be collisions in resources used for the sidelink communication.

SUMMARY

In general, example embodiments of the present disclosure provide a solution for communication.

In a first aspect, there is provided a method for communication. The communication method comprises: receiving, at a first terminal device, first control information from a second terminal device, the first control information indicating a first set of resources reserved by the second terminal device; receiving second control information from a third terminal device, the second control information indicating a second set of resources of resources reserved by the third terminal device; determining whether the first set of resources and the second set of resources overlap; in accordance with a determination that the first set of resources at least partially overlap with the second set of resources, determining whether a condition associated with coordination of terminal devices is satisfied; and in accordance with a determination that the condition is satisfied, transmitting an indication concerning overlapped resources to at least one of the second and third terminal devices.

In a second aspect, there is provided a method for communication. The communication method comprises: generating, at a second terminal device, control information indicating a set of resources reserved by the second terminal device; transmitting the control information to a first terminal device; and receiving an indication concerning overlapped resources from the first terminal device.

In a third aspect, there is provided a first terminal device. The terminal device comprises a processing unit; and a memory coupled to the processing unit and storing instructions thereon, the instructions, when executed by the processing unit, causing the first terminal device to perform acts comprising: receiving, at a first terminal device, first control information from a second terminal device, the first control information indicating a first set of resources reserved by the second terminal device; receiving second control information from a third terminal device, the second control information indicating a second set of resources of resources reserved by the third terminal device; determining whether the first set of resources and the second set of resources overlap; in accordance with a determination that the first set of resources at least partially overlap with the second set of resources, determining whether a condition associated with coordination of terminal devices is satisfied; and in accordance with a determination that the condition is satisfied, transmitting an indication concerning overlapped resources to at least one of the second and third terminal devices.

In a fourth aspect, there is provided a second terminal device. The terminal device comprises a processing unit; and a memory coupled to the processing unit and storing instructions thereon, the instructions, when executed by the processing unit, causing the second terminal device to perform acts comprising: generating, at a second terminal device, control information indicating a set of resources reserved by the second terminal device; transmitting the control information to a first terminal device; and receiving an indication concerning overlapped resources from the first terminal device.

In a fifth aspect, there is provided a computer readable medium having instructions stored thereon, the instructions, when executed on at least one processor, causing the at least one processor to carry out the method according to the first or second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
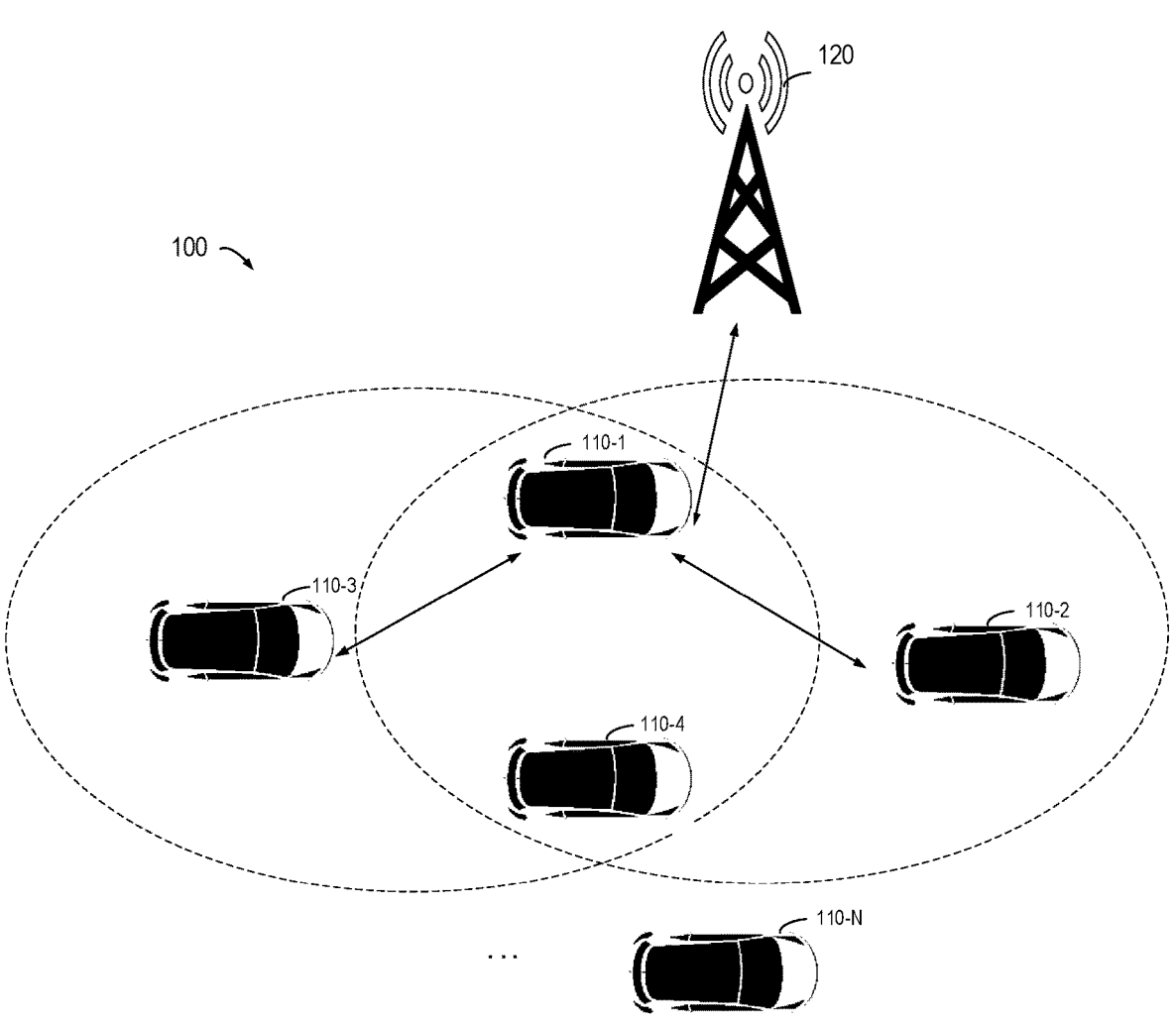
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.95G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, sidelink communication has been proposed. The V2V communication may reply on the sidelink communication. The V2V communications comprises a wireless network where automobiles send messages to each other with information about what they're doing. This data would include one or more of: speed, location, direction of travel, braking, and loss of stability. The technology behind V2V communication allows vehicles to broadcast and receive omni-directional messages (up to 10 times per second), creating a 360-degree "awareness" of other vehicles in proximity. Vehicles equipped with appropriate software (or safety applications) can use the messages from surrounding vehicles to determine potential crash threats as they develop. Further, a technology named "inter-UE coordination" has been proposed. In particular, a set of resources may be determined at a terminal device. Information about this set of resources may be sent to a further terminal device. The further terminal device will take the information into account in resource selection for its own transmission. However, hidden node problems in the sidelink communication have not been addressed.

According to embodiments of the present disclosure, a first terminal device receives first control information indicating a first set of resources reserved by a second terminal device and second control information indicating a second set of resources reserved by a third terminal device, respectively. If the first set of resources and the second set of resources overlap with each other, the first terminal device determines whether a condition associate with coordination of terminal devices is satisfied. If the condition is satisfied, the first terminal device transmits an indication to at least one of the second and third terminal devices. In this way, collisions in resources can be avoided. Further, it also can solve the hidden node problem.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110." The number N can be any suitable integer number. Only for the purpose of illustrations, the communication system 100 may refer to a V2V communication system and the terminal device 110 may be implemented at a vehicle.

The communication system 100 further comprises a network terminal device. The numbers of terminal devices and network devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 902.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
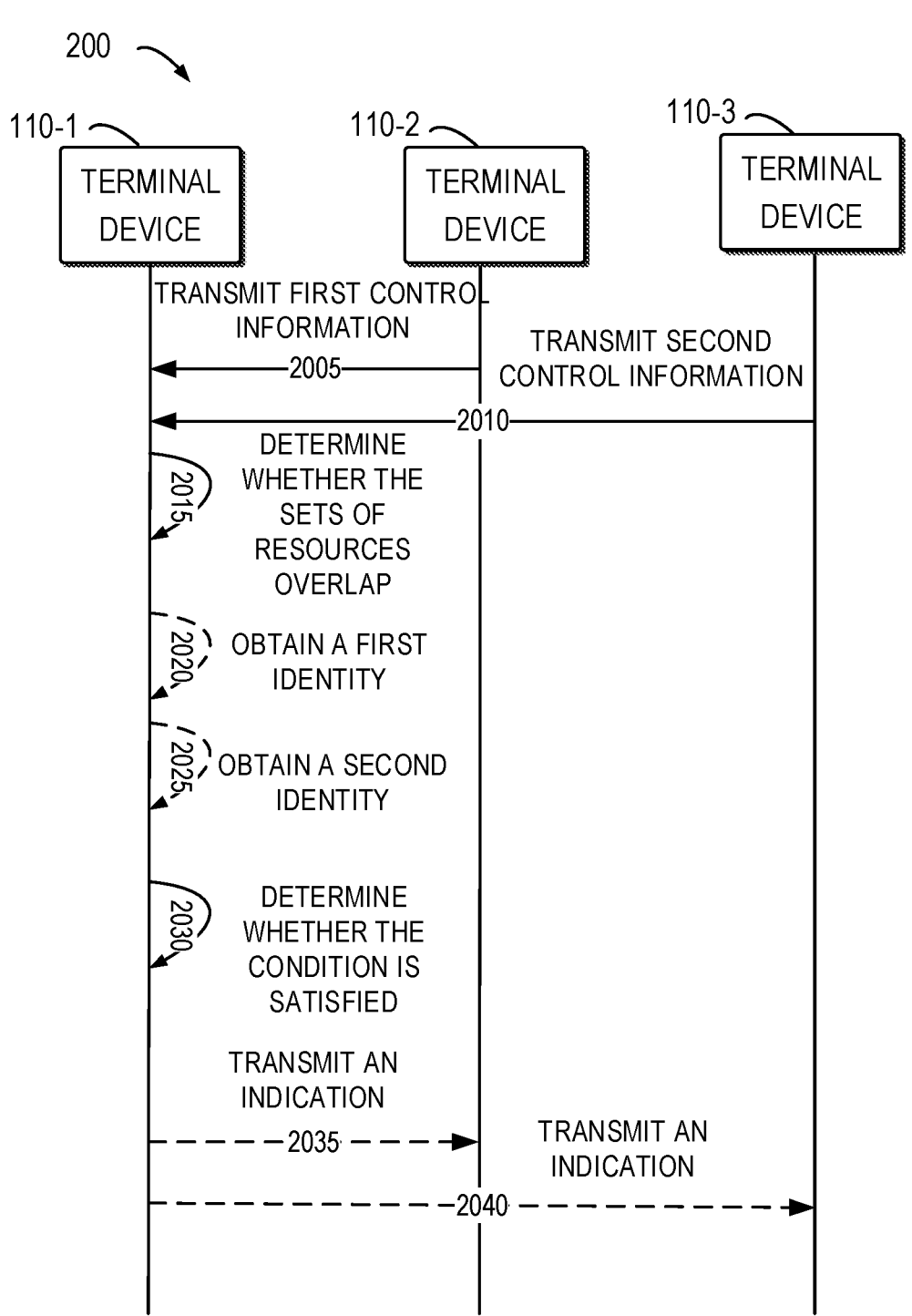
FIG. 2 illustrates a signaling flow for preventing frequent handover and/or cell re-selection according to some embodiments of the present disclosure.

Embodiments of the present disclosure will be described in detail below. Reference is first made to FIG. 2, which shows a signaling chart illustrating process 200 among network devices according to some example embodiments of the present disclosure. Only for the purpose of discussion, the process 200 will be described with reference to FIG. 1. The process 200 may involve the terminal device 110-1, the terminal device 110-2 and the terminal device 110-3 in FIG. 1. Only for the purpose of illustrations, the terminal device 110-1 may be referred to as the first terminal device, the terminal device 110-2 may be referred to as the second terminal device, and the terminal device 110-3 may be referred to as the third terminal device.

Figure 3:
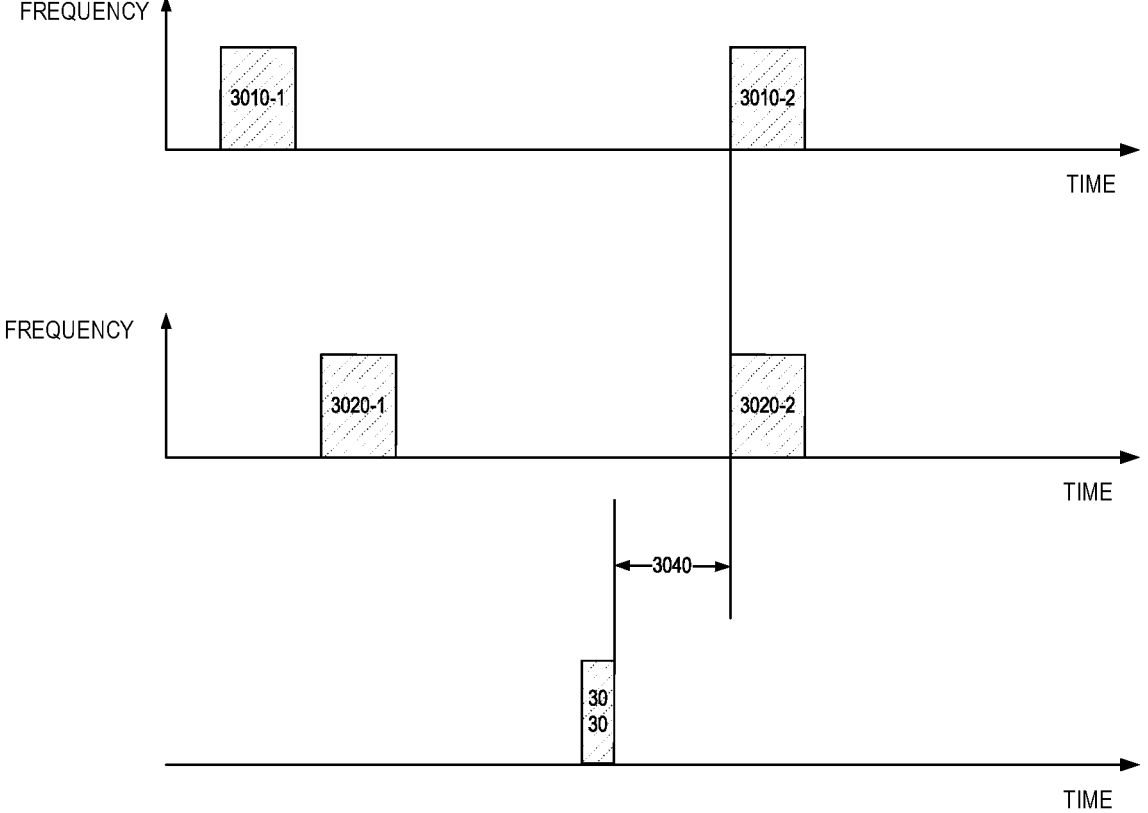
FIG. 3 illustrates a simplified block diagram of resource allocation according to some embodiments of the present disclosure.
Figure 4:
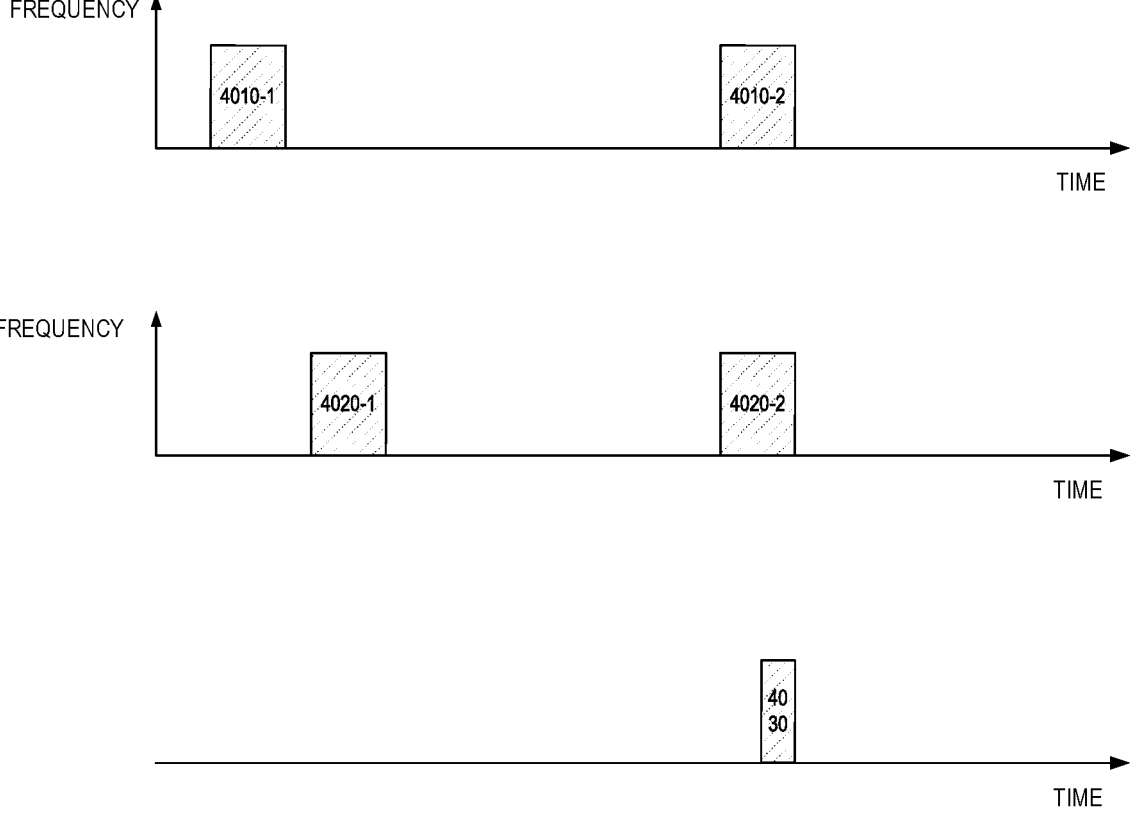
FIG. 4 illustrates a simplified block diagram of resource allocation according to some embodiments of the present disclosure.
Figure 5:
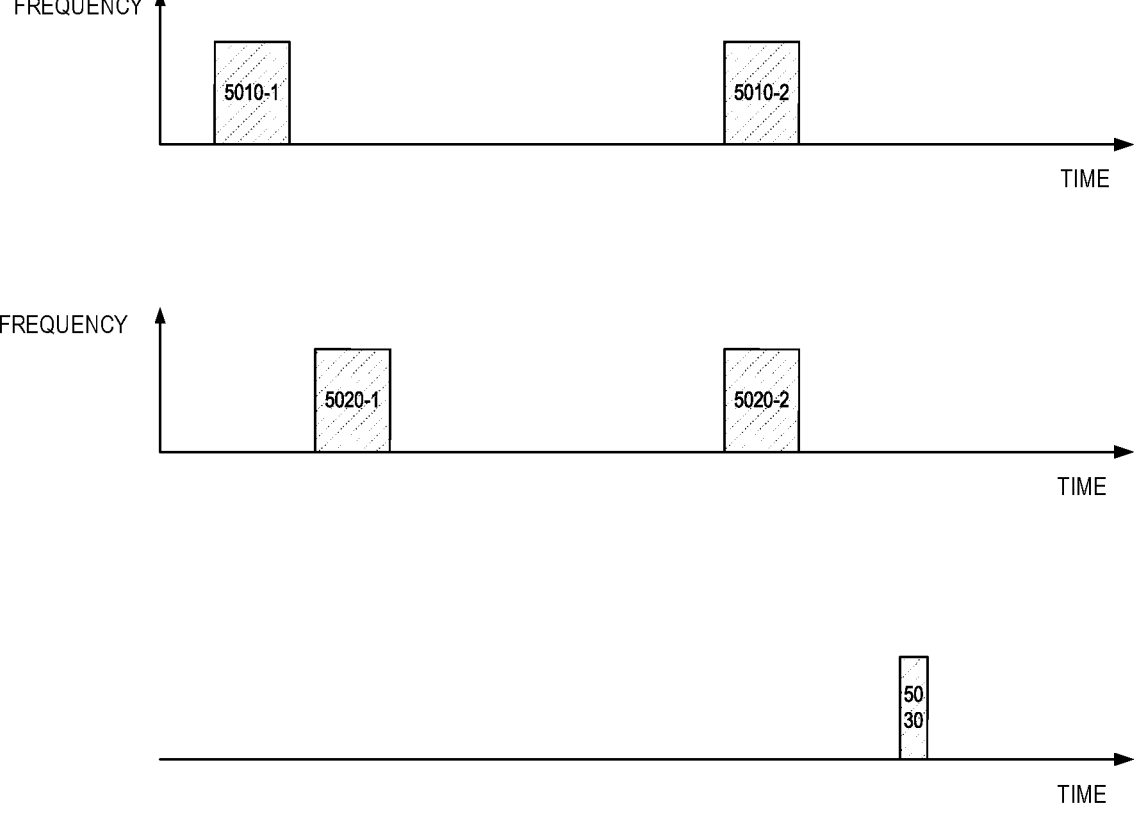
FIG. 5 illustrates a simplified block diagram of resource allocation according to some embodiments of the present disclosure.

The second terminal device 110-2 transmits 2005 first control information to the first terminal device 110-1. The first control information indicates a first set of resources reserved by the second terminal device 110-2. The first set of resources may refer to time-domain and/or frequency domain resources which can be used for communication. In some embodiments, the first control information may be sidelink control information. In other embodiments, the first control information may comprise a first identity of a target terminal device. The second terminal device 110-2 may communicate with the target terminal device using the first set of resources. The first control information may comprise first stage sidelink control information (SCI) transmitted in a physical sidelink control channel (PSCCH) and second stage SCI transmitted in a physical sidelink shared channel (PSSCH). For example, as shown in FIG. 3, the first control information may be transmitted in physical sidelink control channel (PSCCH) and physical sidelink shared channel (PSSCH) 3010-1. The first control information may indicate that a resource block 3010-2 (i.e., the first set of resource) can be reserved by the second terminal device 110-2 for further transmission. Similarly, as shown in FIG. 4, the first control information may be transmitted in physical sidelink control channel (PSCCH) and physical sidelink shared channel (PSSCH) 4010-1. The first control information may indicate that a resource block 4010-2 (i.e., the first set of resource) can be reserved by the second terminal device 110-2 for further transmission. As shown in FIG. 5, the first control information may be transmitted in physical sidelink control channel (PSCCH) and physical sidelink shared channel (PSSCH) 5010-1. The first control information may indicate that a resource block 5010-2 (i.e., the first set of resource) can be reserved by the second terminal device 110-2 for further transmission.

The third terminal device 110-3 transmits 2010 second control information to the first device 110-1. The second control information indicates a second set of resources reserved by the third terminal device 110-3. The second set of resources may refer to time-domain and/or frequency domain resources which can be used for communication. In some embodiments, the second control information may be sidelink control information. In other embodiments, the second control information may comprise a second identity of a further target terminal device. The third terminal device 110-3 may communicate with the further target terminal device using the second set of resources. The second control information may comprise first stage sidelink control information (SCI) transmitted in a physical sidelink control channel (PSCCH) and second stage SCI transmitted in a physical sidelink shared channel (PSSCH). For example, as shown in FIG. 3, the second control information may be transmitted in physical sidelink control channel (PSCCH) and physical sidelink shared channel (PSSCH) 3020-1. The second control information may indicate that a resource block 3020-2 (i.e., the second set of resource) can be reserved by the third terminal device 110-3 for further transmission. Similarly, as shown in FIG. 4, the second control information may be transmitted in physical sidelink control channel (PSCCH) and physical sidelink shared channel (PSSCH) 4020-1. The second control information may indicate that a resource block 4020-2 (i.e., the second set of resource) can be reserved by the third terminal device 110-3 for further transmission. As shown in FIG. 5, the second control information may be transmitted in physical sidelink control channel (PSCCH) and physical sidelink shared channel (PSSCH) 5020-1. The second control information may indicate that a resource block 5020-2 (i.e., the second set of resource) can be reserved by the third terminal device 110-3 for further transmission.

The first terminal device 110-1 determines 2015 whether the first set of resources overlap with the second set of resources. In some embodiments, the first terminal device 110-1 may decode the first stage SCI of the first control information which is transmitted in the PSCCH to obtain the first set of resources. The first terminal device 110-1 may also decode the first stage SCI of the second control information which is transmitted in the PSCCH to obtain the second set of resources. In some embodiments, the first stage SCI in control information may comprise a "frequency resource assignment" field, a "time resource assignment" field and a "resource reservation period" field.

In some embodiments, the first set of resources may be fully overlapped with the second set of resources. For example, as shown in FIG. 3, the resource block 3010-2 fully overlapped with the resource block 3020-2 in both time-domain and frequency-domain. Similarly, as shown in FIGS. 4 and 5, the resource block 4010-2 fully overlapped with the resource block 4020-2 in both time-domain and frequency-domain and the resource block 5010-2 fully overlapped with the resource block 5020-2 in both time-domain and frequency-domain.

Alternatively, the first set of resources may be partially overlapped with the second set of resources. For example, the first set of resources and the second set of resources may partially overlap in time-domain while fully overlap in frequency-domain. In other embodiments, the first set of resources and the second set of resources may partially overlap in frequency-domain while fully overlap in time-domain. In a further embodiment, the first set of resources and the second set of resources may partially overlap in both frequency-domain and time-domain.

In some embodiments, the first terminal device 110-1 may obtain 2020 the first identity from the first control information. For example, the first terminal device may obtain "Destination ID" which comprises the first identity by decoding the second stage SCI in the first control information. The first terminal device 110-1 may further obtain 2025 the second identity from the second control information. Similarly, the first terminal device may obtain a "Destination ID" field which comprises the second identity by decoding the second stage SCI in the second control information. The first terminal device 110-1 may compare the first identity and the second identity. If the first set of resources and the second set of resources are overlapped, and the first identity and the second identity are the same, the first terminal device 110-1 determines the first set of resources and the second set of resources overlap with each other. The first identity and the second identity may refer to the identity of the first terminal device 110-1. Alternatively, the first identity and the second identity may refer to an identity of a further terminal device, for example, the fourth terminal device 110-4.

The first terminal device 110-1 determines 2030 whether a condition associated with coordination of terminal devices is satisfied. In an example embodiment, the first terminal device 110-1 may determine a start position of overlapped resources between the first set of resources and the second set of resources in time domain. For example, as shown in FIG. 3, the start position of the overlapped resources is the start positions of the resource blocks 3010-2 and 3020-2, since the resource blocks 3010-2 and 3020-2 fully overlap. The first terminal device 110-1 may determine whether an offset between a current time point and the start position exceeds a threshold offset. As shown in FIG. 3, the first terminal device 110-1 may compare the offset 3040 between the current time point 3030 and the start position with the threshold offset. If the offset exceeds the threshold offset, the condition may be satisfied. In some embodiments, for example, as shown in FIGS. 4 and 5, the current time point 4030 and the current time point 5030 are after the start position of the overlapped resource. In such situation, the first terminal device 110-1 may not determine the offset between the current time point and the start position.

Alternatively, the condition may be related to the period of the reserved resources. For example, the first terminal device 110-1 may determine a first period of the first set of resources (for example, the resource block 3010-2, 4010-2 or 5010-2). The first terminal device 110-1 may determine a second period of the second set of resources (for example, the resource block 3020-2, 4020-2 or 5020-2). The first terminal device 110-1 may compare the first period with a threshold period and compare the second period with the threshold period. In some embodiments, the threshold period may be preconfigured. Alternatively or in addition, the threshold period may also be determined by the first terminal device 110-1. If both the first period and the second period exceed the threshold period, the condition is satisfied. Alternatively, if at least one of the first period and the second period exceeds the threshold period, the condition is satisfied.

In other embodiments, the condition may be associated with priorities of services. For example, the first terminal device 110-1 may obtain a first priority of a first traffic of the second terminal device 110-2 from the first control information. The first terminal device 110-1 may obtain a second priority of a second traffic of the third terminal device 110-3. The first terminal device 110-1 may compare the first priority with a first threshold priority and compare the second priority with the first threshold priority. If at least one of the first priority or the second priority exceeds the first threshold priority, the first terminal device 110-1 may determine that the condition is satisfied. Here and hereinafter, the priority of traffic may be obtained from a 'priority' field decoded from the control information and a lower 'priority' value stands for higher priority of traffic.

Figure 6A:
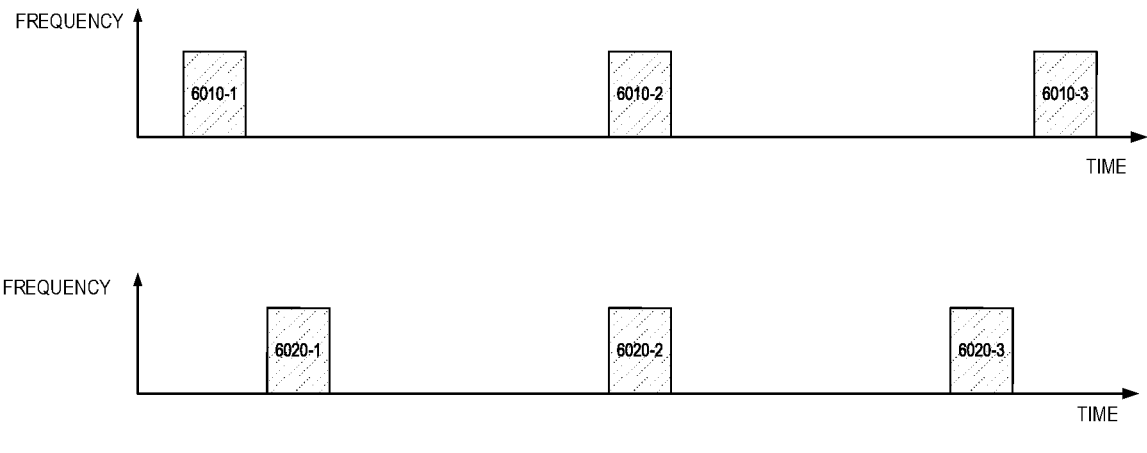
FIGS. 6A-6C illustrate simplified block diagrams of resource overlapping according to some embodiments of the present disclosure.

In some embodiments, the first terminal device 110-1 may determine whether there will be possible further overlaps between the second terminal device 110-2 and the third terminal device 110-3. For example, as shown in FIG. 6A, the first terminal device 110-1 may obtain first periodicity value of reserved resources of the second terminal device

110-2 based on the first control information. The first terminal device 110-1 may obtain second periodicity value of reserved resources of the third terminal device 110-3 based on the second control information. If the first periodicity value and the second periodicity value are different and do not equal to zero, the first terminal device 110-1 may determine that there will be future overlaps. For example, as shown in FIG. 6A, the first periodicity value among the resource blocks 6010 (for example, the resource blocks 6010-1, 6010-2 and 6010-3) is different from the second periodicity value among the resource 6020 (for example, the resource blocks 6020-1, 6020-2 and 6020-3). The resource block 6010-2 and the resource block 6020-2 overlap.

Figure 6B:
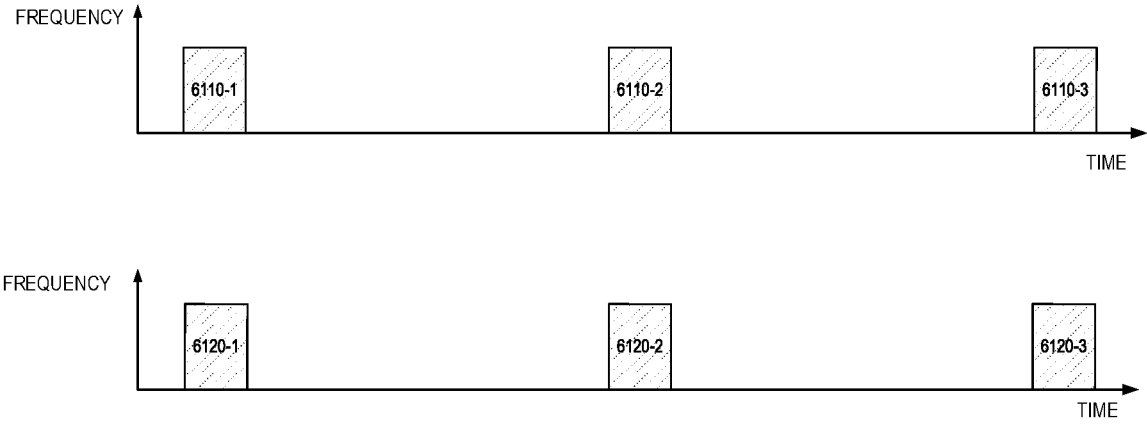

Alternatively, if the first periodicity value and the second periodicity value are the same and do not equal to zero, the first terminal device 110-1 may determine that there be overlaps between resources served by the second terminal device 110-2 and the third terminal device 110-3. For example, as shown in FIG. 6B, the first periodicity value among the resource blocks 6110 (for example, the resource blocks 6110-1, 6110-2 and 6110-3) are same as the second periodicity value among the resource 6120 (for example, the resource blocks 6120-1, 6120-2 and 6120-3). The resource blocks 6110 and the resource blocks 6120 overlap with each other.

Figure 6C:
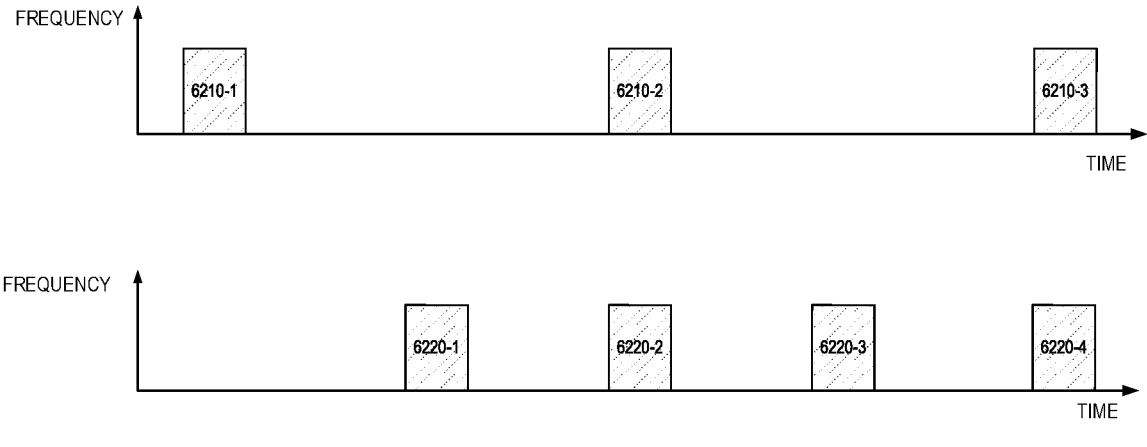

In addition, if the first periodicity value and the second periodicity value have multiple relation and do not equal to zero, the first terminal device 110-1 may determine that there be overlaps between resources served by the second terminal device 110-2 and the third terminal device 110-3. For example, as shown in FIG. 6C, the first periodicity value among the resource blocks 6210 (for example, the resource blocks 6210-1, 6210-2 and 610-3) is two times as the second periodicity value among the resource 6220 (for example, the resource blocks 6220-1, 6220-2 and 6220-3). The resource block 6210-2 overlaps with the resource blocks 6220-2 and the resource block 6210-3 overlaps with the resource block 6220-4.

In some embodiments, the first terminal device 110-1 may obtain source identity from the control information. In some embodiments, the first terminal device 110-1 may obtain the identity of the second terminal device 110-2 from the first control information. For example, the first terminal device 110-1 may decode "Source ID" in the second stage SCI of the first control information to obtain the identity of the second terminal device 110-2. Similarly, in some embodiments, the first terminal device 110-1 may obtain the identity of the third terminal device 110-3 from the second control information. For example, the first terminal device 110-1 may decode "Source ID" in the second stage SCI of the second control information to obtain the identity of the third terminal device 110-3.

Alternatively or in addition, the first terminal device 110-1 may compare the first priority with the second priority. If the first priority is higher than the second priority, the first terminal device 110-1 may transmit 2035 an indication concerning the overlapped resources to the second terminal device 110-2. Alternatively, if the first priority exceeds the second threshold priority, the condition is satisfied and the first terminal device 110-1 may transmit 2040 the indication to the second terminal device 110-2. In this way, it prevents the high priority traffic from colliding with other traffic.

In other embodiments, if the first priority is higher than the second priority, the first terminal device 110-1 may transmit 2040 the indication to the third terminal device 110-3. Alternatively, if the first priority exceeds the second threshold priority, the condition is satisfied and the first terminal device 110-1 may transmit 2040 the indication to the third terminal device 110-3. In this way, it ensures that the high priority traffic can use the reserved resources, thereby improving reliability.

In a further embodiment, the first terminal device 110-1 may compare a priority of a traffic of the first terminal device 110-1 with a third threshold priority. If the priority is below the third threshold priority, the condition is satisfied. In this way, it avoids frequent coordination operations.

In some embodiments, the first terminal device 110-1 may decode first data information from the second terminal device 110-2. The first terminal device 110-1 may also decode second data information from the third terminal device 110-3. If at least one of the first data information or the second data information cannot be decoded successfully, the condition is satisfied. The first terminal device 110-1 may transmit 2040 the indication to the terminal device whose data information cannot be decoded successfully.

Alternatively, the first terminal device 110-1 may transmit the indication to the second terminal device 110-2 and the third terminal device 110-3. In some embodiments, the first terminal device 110-1 may determine a channel busy ratio of the first terminal device 110-1. The channel busy ratio may be compared with a threshold ratio. If the channel busy ratio exceeds a threshold ratio, the indication may be transmitted. Alternatively or in addition, the coordination of terminal devices may be enabled/disabled by higher layer parameters.

In some embodiments, the indication may comprise a time and frequency domain location of the overlapped resources. In some embodiments, the overlapped resources may refer to the resources overlapping between the first set of resources and the second set of resources. Alternatively or in addition, the overlapped resources may refer to future overlapped resources which are determined by the first terminal device 110-1 based on the first control information and the second control information. In some embodiments, the indication may comprise an identity of a destination terminal device. The destination terminal device may be the first terminal device 110-1. Alternatively or in addition, the destination terminal device may be other suitable terminal devices. For example, if the first terminal device 110-1 obtains the identity of the fourth terminal device 110-4 from the first control information and the second control information, the indication may comprise the identity of the fourth terminal device 110-4 and/or a hidden node problem indication. In other embodiments, if the first terminal device 110-1 obtains the identity of the first terminal device 110-1 from the first control information and the second control information, the indication may comprise a hidden node problem indication. For example, the identity of the fourth terminal device 110-4 is obtained from the "Destination ID" fields by decoding the second stage SCI from the first control information and the second control information. In some embodiments, the indication may also comprise priority and/or resource reservation period of the corresponding overlapped terminal devices. For example, second terminal device 110-2 is the overlapped terminal devices of third terminal device 110-3 and vice versa.

The indication may be transmitted via Radio Resource Control signaling. Alternatively, the indication may be transmitted in physical sidelink shared control channel. In other embodiments, the medium access control (MAC) control element (CE) may be used to transmit the indication.

Figure 7:
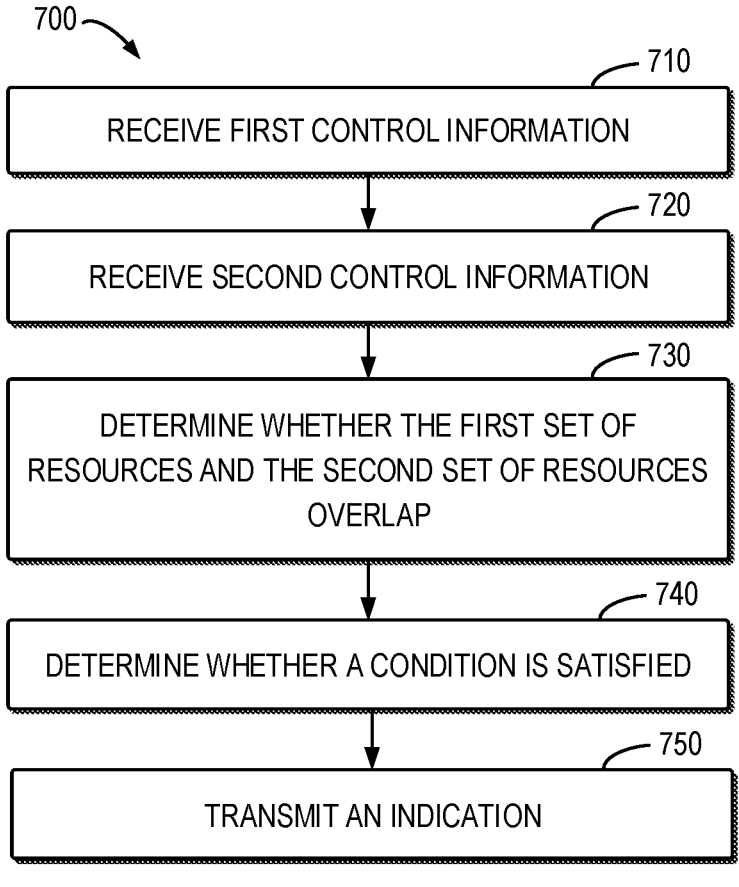
FIG. 7 is a flowchart of an example method in accordance with an embodiment of the present disclosure.

FIG. 7 shows a flowchart of an example method 700 in accordance with an embodiment of the present disclosure. The method 700 can be implemented at any suitable terminal devices. Only for the purpose of illustrations, the method 700 can be implemented at the first terminal device 110-1 as shown in FIG. 1.

At block 710, the first terminal device 110-1 receives first control information from the second terminal device 110-2. The first control information indicates the first set of resources reserved by the second terminal device 110-2.

The first set of resources may refer to time-domain and/or frequency domain resources which can be used for communication. In some embodiments, the first control information may be sidelink control information. In other embodiments, the first control information may comprise a first identity of a target terminal device. The second terminal device 110-2 may communicate with the target terminal device using the first set of resources.

At block 720, the first terminal device 110-1 receives second control information from the third terminal device 110-3. The second control information indicates the second set of resources reserved by the third terminal device 110-3.

The second set of resources may refer to time-domain and/or frequency domain resources which can be used for communication. In some embodiments, the second control information may be sidelink control information. In other embodiments, the second control information may comprise a second identity of a further target terminal device. The third terminal device 110-3 may communicate with the further target terminal device using the second set of resources.

At block 730, the first terminal device 110-1 determines whether the first set of resources and the second set of resources overlap. In some embodiments, the first terminal device 110-1 may decode the first stage SCI of the first control information which is transmitted in the PSCCH to obtain the first set of resources. The first terminal device 110-1 may also decode the first stage SCI of the second control information which is transmitted in the PSCCH to obtain the second set of resources. In some embodiments, the first stage SCI in control information may comprise a "frequency resource assignment" field, a "time resource assignment" field and a "resource reservation period" field.

In some embodiments, the first set of resources may be fully overlapped with the second set of resources. Alternatively, the first set of resources may be partially overlapped with the second set of resources. For example, the first set of resources and the second set of resources may partially overlap in time-domain while fully overlap in frequency-domain. In other embodiments, the first set of resources and the second set of resources may partially overlap in frequency-domain while fully overlap in time-domain. In a further embodiment, the first set of resources and the second set of resources may partially overlap in both frequency-domain and time-domain.

In some embodiments, the first terminal device 110-1 may obtain the first identity from the first control information. For example, the first terminal device may obtain "Destination ID" which comprises the first identity by decoding the second stage SCI in the first control information. The first terminal device 110-1 may further obtain the second identity from the second control information. Similarly, the first terminal device may obtain a "Destination ID" field which comprises the second identity by decoding the second stage SCI in the second control information. The first terminal device 110-1 may compare the first identity and the second identity. If the first set of resources and the second set of resources are overlapped, and the first identity and the second identity are the same, the first terminal device 110-1 determines the first set of resources and the second set of resources overlap with each other. The first identity and the second identity may refer to the identity of the first terminal device 110-1. Alternatively, the first identity and the second identity may refer to an identity of a further terminal device, for example, the fourth terminal device 110-4.

In some embodiments, the control information may comprise a "frequency resource assignment" field, a "time resource assignment" field and a "resource reservation period" field. The first terminal device 110-1 may decode the corresponding control information and obtain the corresponding set of resources based on the above decoded fields.

At block 740, the first terminal device 110-1 determines whether the condition associated with coordination of terminal devices is satisfied, if the first set of resources at least partially overlap with the second set of resources. In an example embodiment, the first terminal device 110-1 may determine a start position of overlapped resources between the first set of resources and the second set of resources in time domain. The first terminal device 110-1 may determine whether an offset between a current time point and the start position exceeds a threshold offset. If the offset exceeds the threshold offset, the condition may be satisfied.

Alternatively, the condition may be related to the period of the reserved resources. For example, the first terminal device 110-1 may determine a first period of the first set of resources. The first terminal device 110-1 may determine a second period of the second set of resources. The first terminal device 110-1 may compare the first period with a threshold period and compare the second period with the threshold period. In some embodiments, the threshold period may be preconfigured. Alternatively or in addition, the threshold period may also be determined by the first terminal device 110-1. If both the first period and the second period exceed the threshold period, the condition is satisfied. Alternatively, if at least one of the first period and the second period exceeds the threshold period, the condition is satisfied.

In other embodiments, the condition may be associated with priorities of services. For example, the first terminal device 110-1 may obtain a first priority of a first traffic of the second terminal device 110-2 from the first control information. The first terminal device 110-1 may obtain a second priority of a second traffic of the third terminal device 110-3. The first terminal device 110-1 may compare the first priority with a first threshold priority and compare the second priority with the first threshold priority. If at least one of the first priority or the second priority exceeds the first threshold priority, the first terminal device 110-1 may determine that the condition is satisfied.

In some embodiments, the first terminal device 110-1 may determine whether there will be possible further overlaps between the second terminal device 110-2 and the third terminal device 110-3. The first terminal device 110-1 may obtain second periodicity value of reserved resources of the third terminal device 110-3 based on the second control information. If the first periodicity value and the second periodicity value are different and do not equal to zero, the first terminal device 110-1 may determine that there will be future overlaps.

Alternatively, if the first periodicity value and the second periodicity value are the same and do not equal to zero, the first terminal device 110-1 may determine that there always be overlaps between resources served by the second terminal device 110-2 and the third terminal device 110-3.

In addition, if the first periodicity value and the second periodicity value have multiple relation and do not equal to zero, the first terminal device 110-1 may determine that there always be overlaps between resources served by the second terminal device 110-2 and the third terminal device 110-3.

Alternatively or in addition, the first terminal device 110-1 may compare the first priority with the second priority. If the first priority is higher than the second priority, the first terminal device 110-1 may transmit an indication concerning the overlapped resources to the second terminal device 110-2. Alternatively, if the first priority exceeds the second threshold priority, the condition is satisfied. In this way, it prevents the high priority traffic from colliding with other traffic.

In other embodiments, if the first priority is higher than the second priority, the first terminal device 110-1 may transmit the indication to the third terminal device 110-3. Alternatively, if the first priority exceeds the second threshold priority, the condition is satisfied. In this way, it ensures that the high priority traffic can use the reserved resources, thereby improving reliability.

In a further embodiment, the first terminal device 110-1 may compare a priority of a traffic of the first terminal device 110-1 with a third threshold priority. If the priority is below the third threshold priority, the condition is satisfied. In this way, it avoids frequent coordination operations.

In some embodiments, the first terminal device 110-1 may decode first data information from the second terminal device 110-2. The first terminal device 110-1 may also decode second data information from the third terminal device 110-3. If at least one of the first data information or the second data information cannot be decoded successfully, the condition is satisfied.

At block 750, if the condition is satisfied, the first terminal device 110-1 transmits an indication concerning overlapped resources to the second terminal device 110-2 and/or the third terminal device 110-3. In some embodiments, the first terminal device 110-1 may obtain source identity from the control information. In some embodiments, the first terminal device 110-1 may obtain the identity of the second terminal device 110-2 from the first control information. For example, the first terminal device 110-1 may decode "Source ID" in the second stage SCI of the first control information to obtain the identity of the second terminal device 110-2. Similarly, in some embodiments, the first terminal device 110-1 may obtain the identity of the third terminal device 110-3 from the second control information. For example, the first terminal device 110-1 may decode "Source ID" in the second stage SCI of the second control information to obtain the identity of the third terminal device 110-3.

In some embodiments, the first terminal device 110-1 may compare the first priority with the second priority. If the first priority is higher than the second priority, the first terminal device 110-1 may transmit an indication concerning the overlapped resources to the second terminal device 110-2. Alternatively, if the first priority exceeds the second threshold priority, the first terminal device 110-1 may transmit the indication to the second terminal device 110-2. In this way, it prevents the high priority traffic from colliding with other traffic.

In other embodiments, if the first priority is higher than the second priority, the first terminal device 110-1 may transmit the indication to the third terminal device 110-3. Alternatively, if the first priority exceeds the second threshold priority, the first terminal device 110-1 may transmit the indication to the third terminal device 110-3. In this way, it ensures that the high priority traffic can use the reserved resources, thereby improving reliability.

In a further embodiment, the first terminal device 110-1 may compare a priority of a traffic of the first terminal device 110-1 with a third threshold priority. If the priority is below the third threshold priority, the condition is satisfied. In this way, it avoids frequent coordination operations.

In some embodiments, the first terminal device 110-1 may decode first data information from the second terminal device 110-2. The first terminal device 110-1 may also decode second data information from the third terminal device 110-3. If at least one of the first data information or the second data information cannot be decoded successfully, the condition is satisfied. The first terminal device 110-1 may transmit 2040 the indication to the terminal device whose data information cannot be decoded successfully.

Alternatively, the first terminal device 110-1 may transmit the indication to the second terminal device 110-2 and the third terminal device 110-3. In some embodiments, the first terminal device 110-1 may determine a channel busy ratio of the first terminal device 110-1. The channel busy ratio may be compared with a threshold ratio. If the channel busy ratio exceeds a threshold ratio, the indication may be transmitted. Alternatively or in addition, the coordination of terminal devices may be enabled/disabled by higher layer parameters.

In some embodiments, the indication may comprise a time and frequency domain location of the overlapped resources. In some embodiments, the indication may comprise a destination identity. For example, if the first terminal device 110-1 obtains the identity of the fourth terminal device 110-4 from the first control information and the second control information, the indication may comprise the identity of the fourth terminal device 110-4 and/or a hidden node problem indication. In other embodiments, if the first terminal device 110-1 obtains the identity of the first terminal device 110-1 from the first control information and the second control information, the indication may comprise a hidden node problem indication. For example, the identity of the fourth terminal device 110-4 is obtained from the "Destination ID" fields by decoding the second stage SCI from the first control information and the second control information. In some embodiments, the indication may also comprise priority and/or resource reservation period of the corresponding overlapped terminal devices. For example, the second terminal device 110-2 is the overlapped terminal devices of third terminal device 110-3 and vice versa.

The indication may be transmitted via Radio Resource Control signaling. Alternatively, the indication may be transmitted in physical sidelink shared control channel. In other embodiments, the medium access control (MAC) control element (CE) may be used to transmit the indication.

Alternatively, the first terminal device 110-1 may transmit the indication to the second terminal device 110-2 and the third terminal device 110-3. In some embodiments, the first terminal device 110-1 may determine a channel busy ratio of the first terminal device 110-1. The channel busy ratio may be compared with a threshold ratio. If the channel busy ratio exceeds a threshold ratio, the indication may be transmitted. Alternatively or in addition, the coordination of terminal devices may be enabled/disabled by higher layer parameters.

Figure 8:
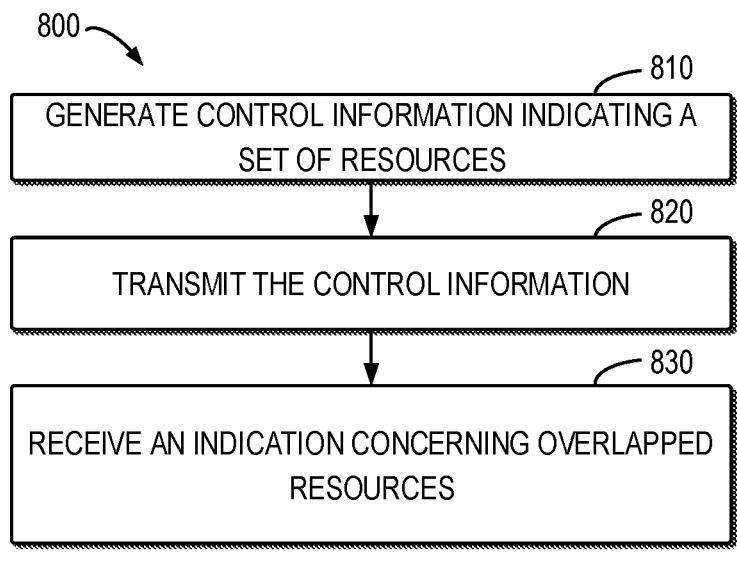
FIG. 8 is a flowchart of an example method in accordance with an embodiment of the present disclosure.

FIG. 8 shows a flowchart of an example method 800 in accordance with an embodiment of the present disclosure. The method 700 can be implemented at any suitable terminal devices. Only for the purpose of illustrations, the method 800 can be implemented at the second terminal device 110-2 as shown in FIG. 1.

At block 810, the second terminal device 110-2 generates control information indicating a set of resources reserved by the second terminal device 110-2. In some embodiments, the second terminal device 110-2 may add an identity of a target terminal device to the control information. The second terminal device may communicate with the target terminal device using the set of resources.

In some embodiments, the second terminal device 110-2 may determine a priority of a traffic of the second terminal device 110-2. If the priority exceeds a threshold priority, the second terminal device 110-2 may select the set of resources. In other embodiments, the second terminal device 110-2 may add the priority of the traffic of the second terminal device 110-2 to the control information. In some embodiments, the threshold priority may be configured from the first terminal device 110-1.

At block 820, the second terminal device 110-2 transmits the control information to the first terminal device 110-1. The control information can be transmitted in any proper signaling.

At block 830, the second terminal device 110-2 receives an indication concerning overlapped resources from the first terminal device 110-1. In some embodiments, the indication may comprise a time and frequency domain location of the overlapped resources. In some embodiments, the indication may comprise a destination identity and/or a hidden node problem indication. In other embodiments, the indication may comprise an identity from the fourth terminal device 110-4. For example, the second terminal device 110-2 may obtain an identity from the first terminal device 110-1 from the indication and determine that the resources reserved for the communication with the first terminal device 110-4 collide with other terminal devices. The indication may comprise a hidden node problem indication. In other embodiments, if the first terminal device 110-1 obtains the identity of the first terminal device 110-1 from the first control information and the second control information, the indication may comprise a hidden node problem indication.

In other embodiments, the indication may comprise an identity from the first terminal device 110-1. For example, the second terminal device 110-2 may obtain an identity from the first terminal device 110-1 from the indication and determine that the resources reserved for the communication with the first terminal device 110-1 collide with other terminal devices. The indication may comprise a hidden node problem indication. In other embodiments, if the first terminal device 110-1 obtains the identity of the first terminal device 110-1 from the first control information and the second control information, the indication may comprise a hidden node problem indication. In some embodiments, the indication may comprise identify information obtained from the "Destination ID" field by decoding the corresponding control information. In some embodiments, the indication may also comprise priority and/or resource reservation period of the corresponding hidden node.

The indication may be transmitted via Radio Resource Control signaling. Alternatively, the indication may be transmitted in physical sidelink shared control channel. In other embodiments, the medium access control (MAC) control element (CE) may be used to transmit the indication.

In other embodiments, the second terminal device 110-2 may determine a further set of resources for further transmission based on the indication. For example, the second terminal device 110-2 may avoid selecting the previous set of resources. Alternatively or in addition, if the priority of traffic of the second terminal device 110-2 is higher than a configured threshold, the second terminal device 110-2 may avoid selecting the previous set of resources. The second terminal device 110-2 can avoid possible collisions in this way. Alternatively or in addition if the priority of traffic of the second terminal device 110-2 is lower than the configured threshold, the second terminal device 110-2 may avoid selecting the previous set of resources. The other terminal devices can use the overlapped resources in this way.

Figure 9:
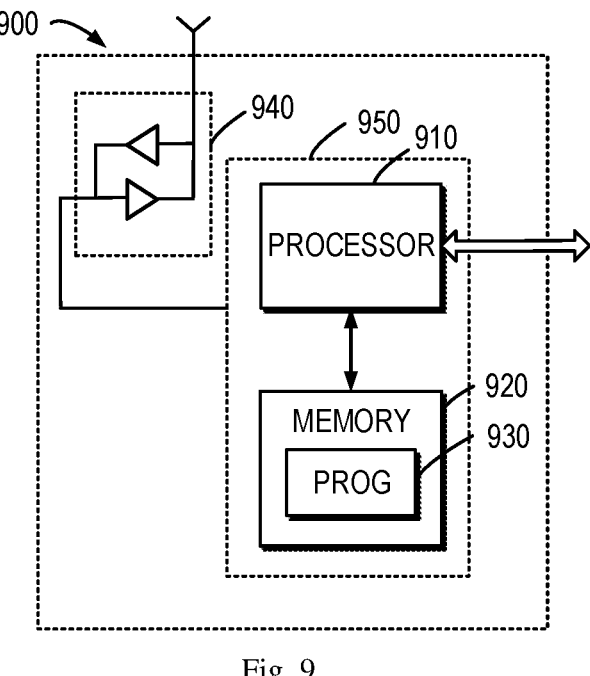
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the terminal device 110 and the network device 120 as shown in FIG. 1. Accordingly, the device 900 can be implemented at or as at least a part of the terminal device 110 or the network device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 920 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 2 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device configured to communicate with a network, a second terminal device and a third terminal device, the first terminal device comprising:

one or more memories storing instructions; and one or more processors configured to process the instructions to control the first terminal device to:

in a case where the first terminal device, the second terminal device, and the third terminal device receive, from the network, first information in a Radio Resource Control (RRC) message, the first information indicating whether a coordination of multiple terminal devices is enabled or not;

receive, from the second terminal device, first control information comprising a first priority value and a first set of resources reserved by the second terminal device;

receive, from the third terminal device, second control information comprising a second priority value and a second set of resources reserved by the third terminal device; and control the first terminal device to determine to transmit, based on the first information, and based on a determination that the first set of resources and the second set of resources overlap, and based on a comparison between the first priority value and the second priority value, second information to either one of the second terminal device and the third terminal device, the second information indicating an overlapped resource set between the first set of resources and the second set of resources.

2. A method for a first terminal device configured to communicate with a network, a second terminal device and a third terminal device, the method comprising:

in a case where the first terminal device, the second terminal device, and the third terminal device receive, from the network, first information in a Radio Resource Control, RRC, message, the first information indicating whether a coordination of multiple terminal devices is enabled or not:

receiving, from the second terminal device, first control information comprising a first priority value and a first set of resources reserved by the second terminal device;

receiving, from the third terminal device, second control information comprising a second priority value and a second set of resources reserved by the third terminal device; and determining to transmit, based on the first information and based on a determination that the first set of resources and the second set of resources overlap, and based on a comparison between the first priority value and the second priority value, second information to either one of the second terminal device and the third terminal device, the second information indicating an overlapped resource set between the first set of resources and the second set of resources.

3. The method according to claim 2, the method further comprising:

obtaining a first identity from second stage sidelink control information (SCI) in the first control information;

obtaining a second identity from second stage SCI in the second control information; and in a case where the first identity and the second identity are identical to an identity of the first terminal device, determining that the first set of resources and the second set of resources overlap.

4. The method according to claim 3, wherein the first identity and the second identity are a destination identity.

5. The method according to claim 2, wherein the method further comprises:

determining to transmit the second information to the second terminal device based on the first priority value being higher than the second priority value; and determining to transmit the second information to the third terminal device based on the first priority value being lower than the second priority value.

6. The method according to claim 2, wherein the method further comprises:

in a case where the first information indicating that the coordination of multiple terminal devices is enabled, determining to transmit the second information to either one of the second terminal device and the third terminal device.

7. The method according to claim 6, wherein the method further comprises:

communicating with a first one of the second terminal device and the third terminal device that receives the second information by using a resource set other than the overlapped resource set; and communicating with a second one of the second terminal device and the third terminal device by using the overlapped resource set.

8. The method according to claim 2, wherein each of the first set of resources and the second set of resources comprises a frequency resource assignment, a time resource assignment and a resource reservation period.

9. The method according to claim 2, wherein the overlapped resource set is indicated by at least a frequency domain, a time domain and a resource reservation period.

10. The method according to claim 2, wherein the method further comprises:

in a case where the first information indicating that the coordination of multiple terminal devices is disabled, avoiding transmitting the second information to either one of the second terminal device and the third terminal device.

11. A second terminal device configured to communicate with a network and a first terminal device, the second terminal device comprising:

one or more memories storing instructions; and one or more processors configured to process the instructions to control the second terminal device to:

in a case where the first terminal device, the second terminal device, and a third terminal device receive, from the network, first information in a Radio Resource Control (RRC) message, the first information indicating whether a coordination of multiple terminal devices is enabled or not:

transmit, to the first terminal device, first control information comprising a first priority value and a first set of resources reserved by the second terminal device;

in a case where the first set of resources and a second set of resources overlap, the second set of resources being comprised in second control information transmitted from the third terminal device to the first terminal device, the second set of resources being reserved by the third terminal device, control the second terminal device to use a resource set other than an overlapped resource set between the first set of resources and the second set of resources in response to receiving second information from the first terminal device, the second information indicating the overlapped resource set between the first set of resources and the second set of resources.

12. The method according to claim 11, wherein the method further comprises using the overlapped resource set between the first set of resources and the second set of resources in a case where the method does not receive second information from the first terminal device.

13. A method for a second terminal device communicating with a network and a first terminal device, the method comprising:

in a case where the first terminal device, the second terminal device, and a third terminal device receive, from the network, first information in a Radio Resource Control (RRC) message, the first information indicating whether a coordination of multiple terminal devices is enabled or not:

transmitting, to the first terminal device, first control information comprising a first priority value and a first set of resources reserved by the second terminal device;

in a case where the first set of resources and a second set of resources overlap, the second set of resources being comprised in second control information transmitted from the third terminal device to the first terminal device, the second set of resources being reserved by the third terminal device, using a resource set other than an overlapped resource set between the first set of resources and the second set of resources in response to receiving second information from the first terminal device, the second information indicating the overlapped resource set between the first set of resources and the second set of resources.

\* \* \* \* \*